Dec. 20, 1955    H. E. ZANKEY    2,727,585
APPARATUS FOR THE TREATMENT OF GASES
Filed Jan. 10, 1950    2 Sheets-Sheet 1

INVENTOR.
HARRY E. ZANKEY.
BY Christy, Parmelee & Strickland
ATTORNEYS.

Dec. 20, 1955  H. E. ZANKEY  2,727,585
APPARATUS FOR THE TREATMENT OF GASES
Filed Jan. 10, 1950  2 Sheets-Sheet 2

INVENTOR.
HARRY E. ZANKEY.
BY Christy, Parmelee & Strickland
ATTORNEYS.

United States Patent Office 2,727,585
Patented Dec. 20, 1955

2,727,585
APPARATUS FOR THE TREATMENT OF GASES

Harry E. Zankey, Ross Township, Allegheny County, Pa., assignor, by mesne assignments, to W. E. Moore and Company, Pittsburgh, Pa., a corporation of Delaware Application January 10, 1950, Serial No. 137,689

8 Claims. (Cl. 183—4.5)

My invention relates to apparatus for the treatment of gas wherein a gas is brought into contact with an adsorptive material which adsorbs the undesired moisture or other condensible or extractable unwanted impurities. Such apparatus is used for example to extract moisture from air by passing a stream of it through horizontal beds of activated alumina, silica gel or other adsorbent materials. The air flow through the adsorbent material is usually continued for a period adequate to substantially reduce its adsorbent capacity after which that capacity may be restored by a reactivation or regeneration treatment usually employing heated air.

Particularly my invention is concerned with the shape of the beds of such an apparatus wherein the adsorptive material in granular form is contained within a suitable tray or series of trays each of which is arranged horizontally.

In such apparatus for treating gas, the beds of granular adsorbent material are usually subjected to vibration caused by the operating equipment such as the power operated fans, and this vibration causes the top surface of the adsorbent material to vary so that the thickness of the adsorptive bed after the equipment has been in use for a short period varies considerably and especially is this true at the edges and corners of relatively shallow (say for example of the order of 5 inches) horizontally disposed beds, although it is also present to a lessened degree in deeper beds, say of the order of 17 inches in depth or even deeper. This lowering of the level at the edges and corners causes uneven distribution of air flow since a thin portion allows more than its share of the flowing air to pass therethrough. The deleterious effect is heightened since the thin areas contain less desiccant and this becomes saturated long before the deeper and much more extensive sections are still capable of further satisfactory adsorption. To overcome this, it is standard practice to rake the beds to a level surface at intervals.

It is the object of my invention to slope the edges or the corners of the granular adsorptive material beds in such a manner as to insure that the top of the material will remain as even as possible during operation of the unit so that the depth of the bed will be consistently uniform thereby overcoming the undesirable effects inherent in such beds which become varied in depth, and this encourages channelling and inefficiency after a very brief period of use.

My invention takes into account the said behavior of particles of adsorbent material such as granules of 4 to 8 mesh size activated alumina when used in beds or trays of a usual size (say 12 by 24 inches) with a depth of say 4 or 5 inches which are the dimensions of a typical bed used for air conditioning and will serve as a good example. Of course the beds may be much larger and of greater depth. They also may be smaller in all dimensions.

I prefer to make my adsorbent beds with four inwardly and downwardly sloping sides although I can obtain good results with a lesser number of sloped sides say two, or by sloping the corners only.

The most effective slope for the sides of the trays is in theory a slope which is normal to the angle of repose of the granular material composing the bed. For activated alumina having particles of 4 to 8 mesh size the angle of repose is of the order of 33¼° from the horizontal and the most effective slope is of the order of 56¾° from the horizontal.

My invention accomplishes its desired results with equipment which is no more expensive than the ordinary horizontal beds. In the accompanying drawings which are largely diagrammatic, I have shown certain presently preferred embodiments of my invention, as applied to an air conditioning unit although it is to be understood that it may be used in equipment for treating other gases.

Figure 9:
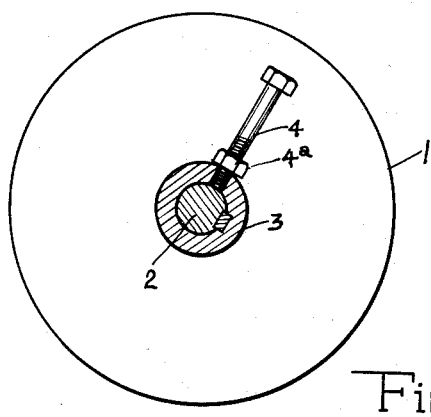
Figure 9 is a diagram of a rotating fan for providing one vibration A.
Figure 10:
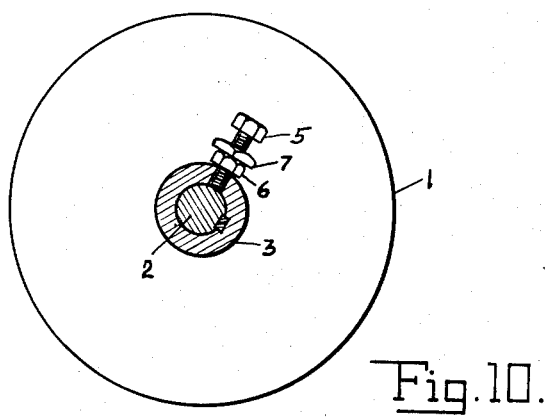
Figure 10 is a diagram of a rotating fan for providing another vibration B.

I have determined the desirable slopes of the tray sides by a series of experiments in which a bed 18″ by 24″ by 4″ deep, was vibrated by a fan purposely thrown out of balance. The fan was keyed to the ¾″ shaft of a one-half horsepower, 220 v.—1.4 A.—60 cycles—3 phase motor at 3450 R. P. M. The fan was made of cast aluminum, weighed 45 ounces, had 16 equally spaced blades with an external diameter of 10⅛ inches and a hub 1⅜ inches in diameter and 2 inches long. The average face velocity of the air blown upwardly through the bed was about 50 feet per minute. This vibration device and fan is schematically illustrated in Figure 9 wherein the fan is designated 1, the motor shaft 2, and the hub 3. To produce vibration "A" there was screwed into the hub to bear against the shaft 2, a standard hexagon head steel cap screw 4 one quarter inch by 1¾ inch which was locked in place by a ¼ inch standard hexagon nut 4a bearing against the hub. To produce vibration B the cap screw 4 was replaced by a ¼ x 1″ standard hexagon head steel cap screw 5 which was locked in place by a ¼" standard hexagon nut 6 which rested against the hub and a ¼" standard square nut 7 which bore against the nut 6.

Figure 8:
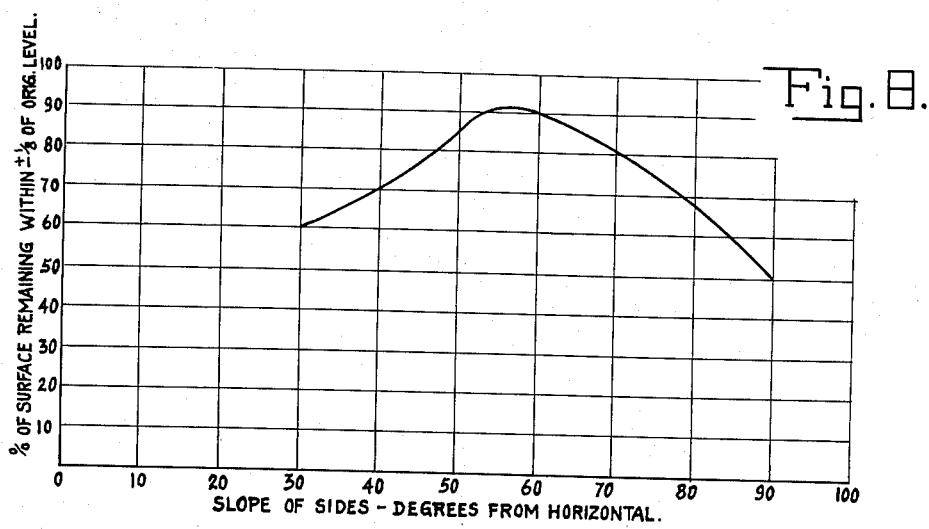
Figure 8 is a graph showing the relative levelness of typical beds of adsorbent material having sides of different slopes after having been subjected to vibration for a definite period.

The experiments were conducted with the four sides sloped at 30°, 45°, 60°, and 75° from the horizontal, the beds subjected to vibration "A." Tests were also made with the two long sides (24") sloped at 60° from the horizontal, while the two end walls were vertical and also with only the four corners sloped at about 60° from the horizontal. Considerable benefits were found to result even when the four corners were sloped; also when the two long sides were sloped, but the maximum benefit was secured when the four sides were sloped at an angle of about 60°. The experiments were run and readings taken at the end of a one-half hour run, at which time the portions of the surface of the bed has assumed approximately steady levels. When the sides of the trays were vertical, the surface remained level for 49.3% of its area when subjected to vibration A, and at the end of two hours, the percentage had dropped to 39.4%. From the test results with all four sides sloped, the graph shown in Figure 8 was plotted with the percentage of surface remaining within plus or minus ⅛ of an inch of original level being the abscissa and the slope of sides—degrees from horizontal being the ordinates. It will be observed that the most desirable slope of the sides is about 57°, at which slope about 92° of the bed area remains substantially at its original level. A fairly satisfactory condition is found when the sides are sloped between about 35° and 80°, between which slopes the percent of the bed surface remaining substantially level will vary between 65 per cent and 92 per cent. When subject to vibration B for a one-half hour test, the 60° sloped sided tray showed 86.2% of the surface of the bed was approximately level. In all cases where vertical sides were used, there was a severe depression at each corner, whereas with sloped sides, the corners and edges were no more uneven than the middle areas of the bed.

Figure 11:
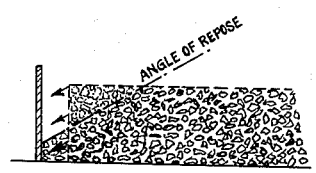
Figure 11 is a diagram showing the effect of vibration on particles in a straight sided bed.

It appears that the effect of vibration on the granules is to cause them to move perpendicular to the retaining surfaces. Thus when vertical sides are used in the construction of the trays, the sides deflect inward and crowd the granules toward the center of the bed. When the side vibrates outward there tends to be a momentary gap between the wall and the granules which leaves an unsupported wall of granules which collapses, and some of the granules fall and wedge in the space. When the next inward deflection occurs, the particles are again crowded horizontally toward the center of the bed, and upon the outward deflection, the particles drop a little further and repeated vibrations cause the edges of the bed to sink considerably. Figure 11 shows this, wherein the final position of the granules will be very close to the angle of repose shown in dot and dash line of the material. The original level of the material is shown in broken line.

Figure 12:
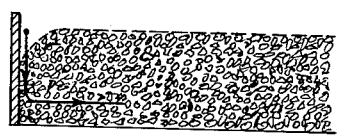
Figure 12 is a diagram showing the path of a particle of adsorbent material in a straight sided bed when subjected to vibration.

Figure 12 shows the path of a granule when subjected to vibrations of the sides of the tray. The effect of wedging is felt a considerable distance into the bed.

Figure 13:
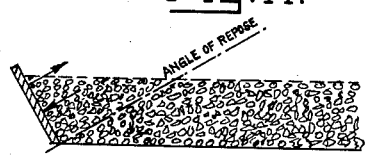
Figure 13 is a diagram showing the effect of vibration on particles in a bed having downward and inwardly sloping sides.

In Figure 13 there is shown the effect on the bed of sloping sides. Inward deflection of the sides move the granules in a direction perpendicular to the slope and upward, and when the deflection is outward the particles settle back very close to their original positions. The surface remains substantially level even after the prolonged vibration. A slope which is normal to the angle of repose of the material seems to be the most effective to prevent unequal settling of the bed surfaces. However, it is to be understood that any degree of slope has a beneficial effect, and that slopes of say from around 25° to around 75° from the horizontal constitute an improvement over the trays having straight sides.

Figure 1:
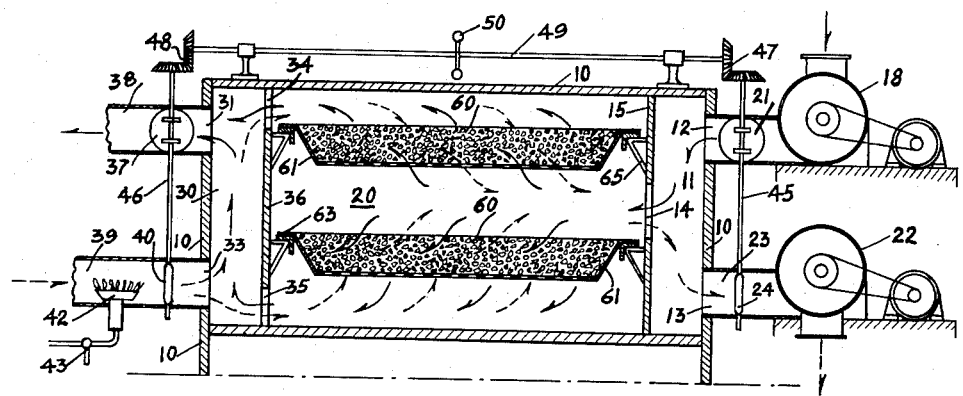
Figure 1 is a vertical sectional view largely schematic through a typical rectangular shaped dehumidifier.

In Figure 1 of the drawings there is shown schematically a vertical section of an air conditioning unit in which the adsorbent filled trays therein used are constructed according to my invention. The unit includes an outer wall or casing 10, rectangular in its horizontal and vertical cross section, and of any suitable construction. As illustrated, the walls are formed of sheet metal and its vertical wall includes removable panels whereby access may be had to the interior of the housing. If so desired, the walls may be covered by heat insulating material. At the right end of the housing, as viewed in Figure 1, there is provided a plenum chamber 11 having spaced-apart openings 12 and 13 through the outer or end wall 10 and a centrally-located port 14, through inner wall 15, and which opens into a dehumidifier chamber 20. The opening 12 is connected to a motor-driven blower 18 by means of which air to be treated, or what may be termed moist air, may be forced into the plenum chamber 11, when the blower is operated and the opening control damper 21 is open (as shown).

Opening 13 is connected to a motor-driven exhaust fan 22 by means of a passage 23 in which a control damper 24, shown in passage closing position, is located. The exhaust fan, when operated and the damper 24 opened, draws air from the plenum chamber 20 and forces it outside as shown by the dotted arrow.

At the opposite or left-hand end of the housing a second plenum chamber 30 is located which has spaced openings 31 and 33 through the outside end walls 10, and two openings 34 and 35 leading through the inner wall 36 to the dehumidifying chamber 20. The opening 34 is located at the top of wall 36, and the opening 35 is located at the bottom of the wall. The openings 31 and 32 are located adjacent the top and bottom walls respectively of the housing. The opening 31 is connected by a discharge passage 38, in which is located a control damper 37, to a desired position of discharge of dehumidified air or treated gas. The damper 37 is shown as being open and thus allows free flow of treated air through the passage 38.

The opening 32 is connected to an inlet passage 39 in which is located a control damper 40 shown in passage closing position. A source of heat, here shown as a gas burner 42 with an appropriate control valve 43 is disposed so as to heat the air which is drawn through passage 39.

It will be observed that the dampers 21 and 24 are secured on the common shaft 45, but at 90° apart, so that when one damper is in open position, as is 21, the other one 24 will be in closed position, thus shutting off flow through the passage in which it is located. The dampers 37 and 40 are similarly arranged on shaft 46. The shafts 45 and 46 are connected by means of bevel gears 47 and 48 respectively to an actuating shaft 49 which may be turned by a wheel 50. The arrangement is such that by turning the shaft 49 the four dampers may be simultaneously manipulated so that the dampers 21 and 37 may be opened and closed together and at the same time the dampers 24 and 40 may be closed and opened together.

Within the dehumidifying or treating chamber 20 which is shown as rectangular in its horizontal and vertical cross sections are located a plurality, here two are shown, of dehumidifying bodies or beds 60 which are vertically spaced apart and of substantially uniform thickness. They extend horizontally across the space between the end walls 15 and 36, and from front to back of the side walls. The beds are each supported in sheet metal trays 61, the bottom portions of the trays being perforated. The trays 61 are preferably formed of sheet metal, usually steel, of about 16 gauge. A convenient perforation is about 126 holes per square inch, each hole being .060" in diameter, and placed in staggered rows about 3/32" center to center. Perforations using other sized holes and different spacings may be employed. The cited perforations are suitable for granules of alumina of 4 to 8 mesh. The sides and ends of the trays are solid.

The trays are located so that one end of each is spaced one on each side of the opening 14, and the left ends (Figure 1) are between the openings 34 and 35. When in the dehumidifying cycle the moist air, shown by full arrows, pass from the plenum chamber 11 through opening 14, thence part of it passes upwardly through the upper bed and out through the opening 34 to the plenum chamber 30, while the rest of the air passes through the lower bed, thence through the lower opening 35 to the plenum chamber 30, and the air in the plenum chamber 30 passes through the passage 38 to the desired point of discharge.

When it is desired to reactivate the beds, the blower 18 is shut off, the dampers 21 and 37 are moved to closed position, at the same time the dampers 24 and 40 are moved to open positions, the gas burner 42 is turned on, the exhaust or suction fan 22 is operated, whereupon the heated air will pass into the plenum chamber 30, thence through the openings 34 and 35, thence through the two beds as shown by the broken arrows. It will be observed that the flow of reactivating air through the beds is in a direction opposite to the flow of the air to be treated. While I have described a manually operated system, it is to be understood that the operating controls may be made wholly or partly automatic.

Figure 2:
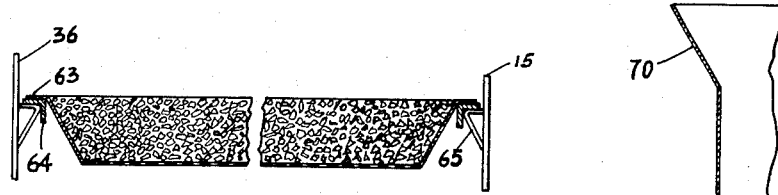
Figure 2 is a vertical sectional view of an adsorbent bed containing granular adsorbent material.
Figure 3:
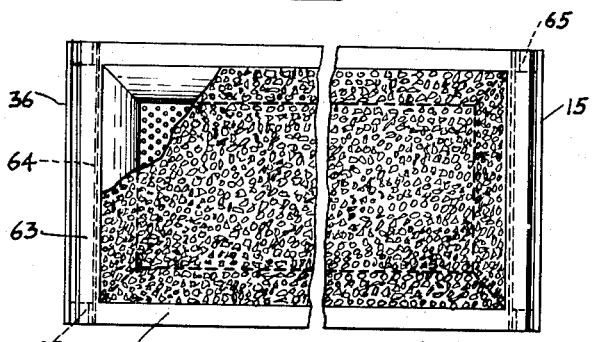
Figure 3 is a plan view of a tray bed with the granular adsorbent material scooped away from the upper left-hand corner to show the sloping sides and perforated tray.

The shape of the sides of the trays is very important. To prevent unwanted channeling of air at the edges of the trays due to the tendency of straight sided trays to thinning of the bed at the edges, I make my trays with sloped sides in whole or in part, or with sloped corners, and of various contours. In Figures 2 and 3, I show a metal tray having sides and ends which slope downwardly and inwardly at an angle of about 60° to the horizontal. The sides and ends are formed of solid sheet metal, while the bottom is perforated as described so that air may pass through the bed. The sides and ends of each of the trays have at the top portions a horizontally-extending shelf 63 reinforced by a depending angle member 64. The angle member 64 is slidably received on a solid bracket 65 secured to the end walls 15 and 36, as well as to the side walls. The structure is such that air passing through the dehumidifying chamber 20 must pass through the granular material in the beds.

Figures 4, 5:
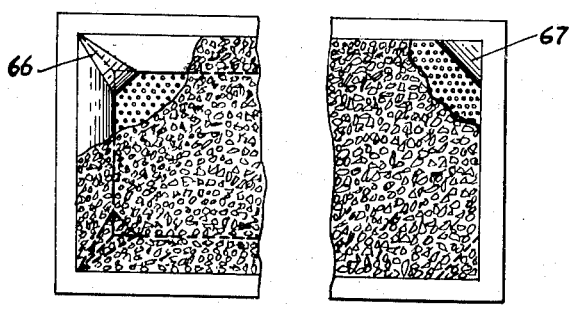
Figure 4 is a plan view of a bed similar to that shown in Figure 3 but showing sloping sides and sloping corners together with the perforated bottom of the tray.
Figure 5 is a vertical sectional view of one side of a bed having a bed with sloping corners.

In Figure 4, I show a tray in which the sides and ends are sloped, and so also are the corners 66.

In Figure 5, the tray there illustrated has the four corners only, 67, sloped 60° from the horizontal. The sides and ends are vertical, otherwise the construction of the trays is as described above.

I have found that the restriction in area due to sloping of the side walls of the tray should not exceed more than about 10%. So in deciding the slope of the sides I prefer to use a slope of the order of 60° from the horizontal where the beds are relatively shallow, but where the use of a slope of 60° would entail a reduction of more than 10% in the surface area of the bed, I may use a slope say up to 75°. A greater slope than this may of course be employed, but above about 75° slope the benefits drop rather quickly and undesirable thinning of the bed occurs around the edges. A slope of around 35° gives some benefits over straight sided trays.

Figure 6:
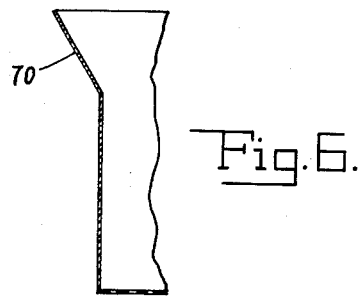
Figure 6 is a vertical sectional view of one end wall of a tray having a sloping top portion.
Figure 7:
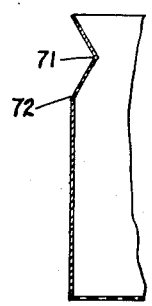
Figure 7 is a vertical sectional view of one side of a bed having still another sloped top portion.

Due to the fact that in thick beds, say of the order of 14 to 18 inches, a slope of say 60° would too greatly restrict the area of the tray bottom, I prefer to slope only the top portion of the side walls of the tray. This construction is illustrated in Figure 6, wherein only the upper part 70 of the tray is sloped for a distance such that the area of the bed would not be restricted more than 10%. A modification of this side wall construction is shown in Figure 7, in which the top portion of the tray walls are sloped inwardly, say at 60°, to the horizontal for a distance to a point 71 so that the area of the restricted portion shall not be lessened from the top area by more than 10%. The tray then slopes outwardly to the point 72, and then vertically down.

While I have shown the presently preferred embodiment of my invention, it is to be understood that various changes and modifications may be made within the following claims.

I claim:

1. In a gas conditioning apparatus of the character described, the combination with a housing having a chamber through which gas to be treated is moved in a vertical path and mechanical means are mounted on the housing for forcing the gas through the chamber, which means impart vibrations to the housing chamber, of a tray having a perforate bottom and imperforate sides, said sides inclining angularly downwardly and inwardly from their upper edges, means mounting the tray in said chamber in a horizontal position so that gas moving vertically thereby must flow through said tray bottom, a filling of granular adsorbing material within the tray upon said bottom and in engagement with said inclined sides providing a substantially uniform surface level of the material, the angle of inclination of the inclined tray sides being substantially normal to the angle of repose of the filling material to thereby render horizontal vibrations of the tray sides substantially ineffective to vary the level of the material adjacent the inclined tray side walls and the length of the inclined side wall measured from the upper edge thereof being such as to effect a restriction in cross sectional area of the material of not more than 10% of the top area of the material in contact with the inclined side walls.

2. The combination as in claim 1 wherein the depth of filling material is of the order of 5 inches, the particle size of the material is of 4 to 8 mesh and the angle of inclination of the tray side walls is between 50 and 65 degrees from the horizontal.

3. The invention defined in claim 1 wherein the tray includes a perforate horizontal bottom portion and imperforate sides each having a portion extending vertically upward from said bottom and joined thereto, the top of said sides flaring outwardly at an angle of from about 25° to about 75° from the horizontal, the sides being proportioned so that the least horizontal area of the tray is not less than about 10% less than the area of the top of the tray.

4. The invention defined in claim 1 wherein the tray includes a perforate horizontal bottom portion and imperforate sides each having a portion extending vertically upward from said bottom and joined thereto, the top portion of the sides flaring inwardly and upwardly for a distance and then upwardly and outwardly.

5. The invention defined in claim 1 wherein the tray includes a perforate horizontal bottom portion and imperforate sides each having a portion extending vertically upward from said bottom and joined thereto, the top portion of the sides flaring inwardly and upwardly for a distance and then upwardly and outwardly, the reduced area of the tray being not appreciably less than about 10% less than the area of the bottom.

6. The invention defined in claim 1 wherein the tray includes a perforate horizontal bottom portion and imperforate sides each having a portion extending vertically upward from said bottom and joined thereto, the top portion of the sides flaring inwardly and upwardly for a distance and then upwardly and outwardly the angle of the uppermost portion being of the order of from 25° to 75° from the horizontal.

7. The invention defined in claim 1 wherein the tray includes a perforate horizontal bottom portion and imperforate sides each having a portion extending vertically upward from said bottom and joined thereto, the top portion of the sides flaring inwardly and upwardly for a distance and then upwardly and outwardly the angle of the uppermost portion being of the order of about 60° from the horizontal.

8. The invention defined in claim 1 characterized by said side wall being comprised of an inclined portion at its upper edge and a depending portion extending vertically downwardly from said inclined portion.

References Cited in the file of this patent

UNITED STATES PATENTS

| | | | |
|---|---|---|---|
| D. 35,670 | Eustis | Feb. 4, | 1902 |
| 333,098 | Atchenson | Dec. 29, | 1885 |
| 601,791 | Flood et al. | Apr. 5, | 1898 |
| 643,396 | Birdsall et al. | Feb. 13, | 1900 |
| 844,858 | Eustis | Feb. 19, | 1907 |
| 1,085,674 | Drager | Feb. 3, | 1914 |
| 1,739,372 | Pirchio | Dec. 10, | 1929 |
| 1,949,205 | Herring et al. | Feb. 27, | 1934 |
| 2,283,989 | Henry | May 26, | 1942 |
| 2,289,894 | Zuhlke | July 14, | 1942 |

FOREIGN PATENTS

| | | | |
|---|---|---|---|
| 249,464 | Great Britain | Aug. 14, | 1925 |
| 646,048 | Germany | June 7, | 1937 |
| 691,060 | Germany | July 29, | 1940 |